United States Patent
Gunugunuri et al.

(10) Patent No.: US 11,208,928 B2
(45) Date of Patent: Dec. 28, 2021

(54) PASSIVE NOX ADSORPTION AND DECOMPOSITION

(71) Applicants: Toyota Motor Engineering & Manufacturing North America, Inc., Plano, TX (US); Toyota Jidosha Kabushiki Kaisha, Toyota (JP)

(72) Inventors: Krishna Gunugunuri, Canton, MI (US); Charles Alexander Roberts, Farmington Hills, MI (US); Torin C. Peck, Ann Arbor, MI (US); Naoto Nagata, Shizuoka (JP)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 59 days.

(21) Appl. No.: 16/382,981

(22) Filed: Apr. 12, 2019

(65) Prior Publication Data
US 2020/0325810 A1   Oct. 15, 2020

(51) Int. Cl.
*B01J 23/83* (2006.01)
*B01J 20/02* (2006.01)
(Continued)

(52) U.S. Cl.
CPC ........ *F01N 3/0842* (2013.01); *B01J 20/0207* (2013.01); *B01J 20/0225* (2013.01);
(Continued)

(58) Field of Classification Search
CPC .... B01J 23/83; B01J 20/0207; B01J 20/0225; F01N 3/0814; F01N 3/0821; F01N 3/0842; F01N 3/101; F01N 3/2066
See application file for complete search history.

(56) References Cited

U.S. PATENT DOCUMENTS 5,500,198 A * 3/1996 Liu ................. B01D 53/864
                                                423/245.3
5,814,577 A * 9/1998 Park ................ B01D 53/945
                                                502/304
(Continued)

FOREIGN PATENT DOCUMENTS

CN        101204657 A    6/2008
WO        2007069485 A3  6/2007

OTHER PUBLICATIONS

Theis et al., "An assessment of low temperature NOx adsorbers for cold-start NOx control on diesel engines," Catalysis Today, vol. 258 Part 2, pp. 367-377 (2015).
(Continued)

*Primary Examiner* — Cam N. Nguyen
(74) *Attorney, Agent, or Firm* — Darrow Mustafa PC; Christopher G. Darrow

(57) ABSTRACT

$NO_x$ abatement compositions include cobalt oxide ($Co_3O_4$) doped with cerium, and have an overall formula $Co_{3-x}Ce_xO_4$, with cerium occupying tetrahedral and/or octahedral sites in the spinel structure. The $NO_x$ abatement compositions possess $NO_x$ storage and $NO_x$ direct decomposition activity. Dual stage $NO_x$ abatement devices include an upstream portion having the $NO_x$ abatement composition to adsorb and store $NO_x$ at low temperature, and then release the $NO_x$ at higher temperature to a downstream catalytic conversion portion.

11 Claims, 6 Drawing Sheets

(51) Int. Cl.
  *F01N 3/08* (2006.01)
  *F01N 3/10* (2006.01)
  *F01N 3/20* (2006.01)

(52) U.S. Cl.
  CPC ............ *B01J 23/83* (2013.01); *F01N 3/0814* (2013.01); *F01N 3/0821* (2013.01); *F01N 3/101* (2013.01); *F01N 3/2066* (2013.01)

(56) References Cited

U.S. PATENT DOCUMENTS

| | | | | |
|---|---|---|---|---|
| 6,060,420 | A * | 5/2000 | Munakata | B01D 53/945 502/302 |
| 9,314,775 | B2 * | 4/2016 | Nitta | B01J 23/83 |
| 2012/0124899 | A1 * | 5/2012 | Difrancesco | B01J 37/031 44/457 |
| 2016/0263561 | A1 | 9/2016 | Nazarpoor et al. | |

OTHER PUBLICATIONS

Piumetti et al., "Gatalysis in Diesel Engine NOx aftertreatment: a review," Catalysis, Structrue & Reality, vol. 1 No. 4, pp. 155-173 (2015).

Babu et al., "Size and Surface Effects of Co-Doped NiO and Co3O4 Nanostructures on Ferromagnetism Behavior Prepared by the Microwave Route," Journal of Physical Chemistry, 118 (4), p. 23335-23348 (2014—Abstract).

Haneda, M. et al., "Alkali metal-doped cobalt oxide catalysts for NO decomposition," Applied Catalysis B Environmental 46 (2003) 473-482.

Hong, W-J. et al., "Direct NO decomposition over a Ce—Mn mixed oxide modified with alkali and alkaline earth species and Co2-TPD behavior of the catalysts," Catalysis Today 164 (2011) 489-494.

Argyle, M., "Supported, Alkali-Promoted Cobalt Oxide Catalysts for NOx Removal from Coal Combustion Flue Gases", Final Report, University of Wyoming, Department of Chemical and Petroleum Engineering (Mar. 2006) 30 pages.

* cited by examiner

PASSIVE NOX ADSORPTION AND DECOMPOSITION

TECHNICAL FIELD

The subject matter described herein generally relates to exhaust gas mitigation and, more particularly, to metal oxides for nitrogen oxide adsorption and decomposition.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Internal combustion vehicles produce exhaust gases during normal operation. Catalysts can be used in vehicle exhaust systems to convert some of these exhaust gases into more desirable gases. Catalysts containing noble metals, such as palladium, platinum, and/or rhodium, can convert some of the exhaust gases to more desirable gases in vehicles which operate at a stoichiometric and/or slightly rich air/fuel (A/F) ratios. In some instances, exhaust gases, like carbon monoxide and hydrocarbons, can be oxidized to carbon dioxide and water, and NO can be reduced to nitrogen.

Accordingly, it would be desirable to provide improved catalysts for direct decomposition of $NO_x$, having high activity and selectivity, and improved $NO_x$ adsorption materials.

SUMMARY

This section provides a general summary of the disclosure, and is not a comprehensive disclosure of its full scope or all of its features.

In various aspects, the present teachings provide a nitrogen oxide ($NO_x$) adsorption component configured to connect to an exhaust system of a vehicle. The $NO_x$ adsorption component includes a cobalt-cerium oxide material having a spinel structure and an empirical formula of $Co_{3-x}Ce_xO_4$, wherein x is between 0 and 3, the cobalt-cerium oxide material comprising a $Ce_2O_3$ concentration of less than 10%.

In other aspects, the present teachings provide nitrogen oxide ($NO_x$) abatement device for use in the exhaust system of a vehicle. The device includes a $NO_x$ adsorption component configured to receive an exhaust gas. The $NO_x$ adsorption component includes a cobalt-cerium oxide material, the cobalt-cerium oxide material having a spinel structure and an empirical formula of $Co_{3-x}Ce_xO_4$, wherein x is between 0 and 3. The device further includes a catalytic component fluidly connected to the $NO_x$ adsorption component, the catalytic component comprising a $NO_x$ catalyst.

In further aspects, the present teachings provide a two-stage $NO_x$ abatement device for removal of $NO_x$ from engine exhaust during a cold start. The device includes an enclosure having upstream and downstream portions defined relative to an intended direction of flow of exhaust gas. The device also includes a low-temperature $NO_x$ storage component configured to adsorb $NO_x$ when at low temperature, and to desorb $NO_x$ when at higher temperature. The low-temperature $NO_x$ storage component includes an $NO_x$ abatement composition having a formula $Co_{3-x}Ce_xO_4$, where $0<x≤3$, and a spinel structure with cerium cations replacing a portion of $Co^{2+}$ and/or $Co^{3+}$ cations at octahedral and/or tetrahedral sites in the spinel. The device further includes a $NO_x$ conversion catalyst located downstream from the storage component, and configured to catalyze conversion of $NO_x$. During an engine cold start, $NO_x$ is retained in the storage component until the exhaust and the device have warmed sufficiently to activate the downstream conversion catalyst.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate some possible implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

Figure 1:
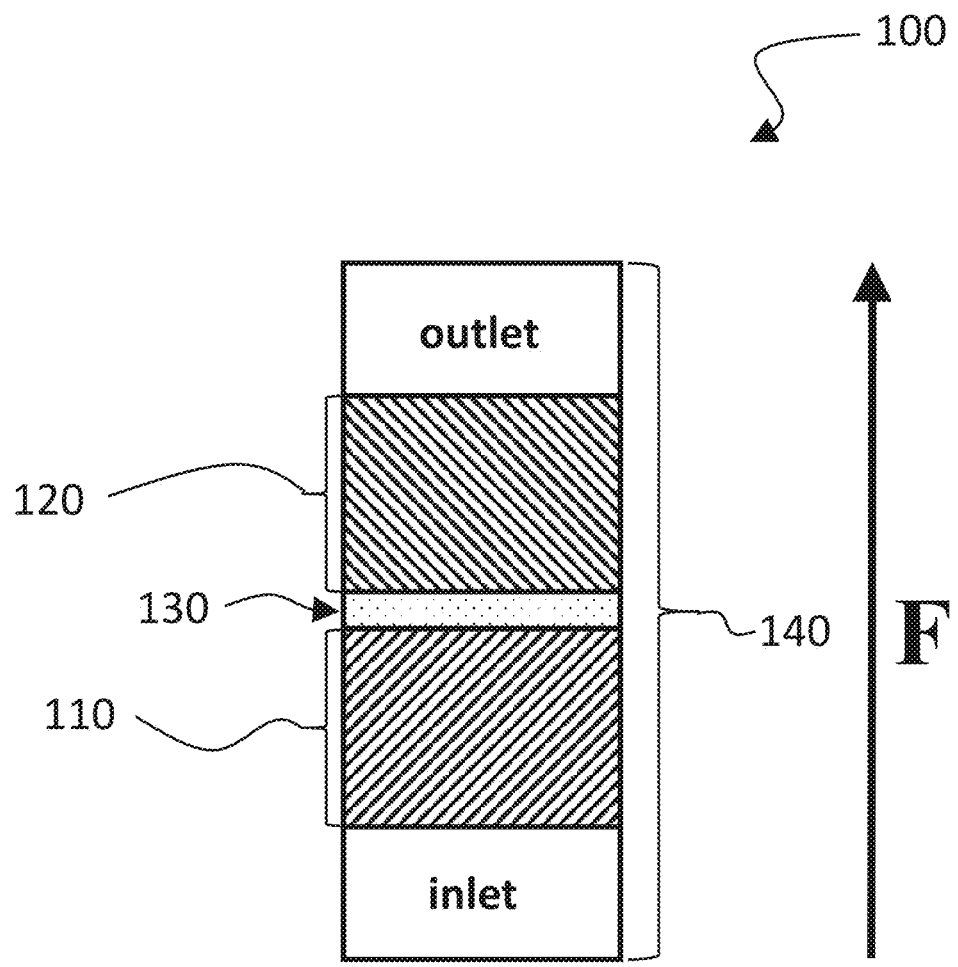
FIG. 1 shows a schematic plan view of an exemplary two-stage $NO_x$ abatement device.

The present teachings provide dual function $NO_x$ abatement compositions, and two-stage methods and devices for the removal of $NO_x$ from a combustion exhaust stream. Compositions of the present teachings can catalyze direct decomposition of $NO_x$ to nitrogen gas and oxygen gas. The disclosed compositions additionally possess superior $NO_x$ storage capacity at low temperature, making them useful in dual stage $NO_x$ abatement devices for cold start conditions. In such implementations, disclosed compositions will adsorb and store $NO_x$ when at low temperature, and then release the $NO_x$ for abatement by a downstream abatement catalyst when higher temperatures are achieved.

$NO_x$ abatement compositions of the present teachings have a general composition $Co_{3-x}Ce_xO_4$, where $0<x\leq3$, and a spinel structure with cerium cations replacing a portion of $Co^{2+}$ and/or $Co^{3+}$ cations at octahedral and/or tetrahedral sites in the spinel. Disclosed catalysts are made by coprecipitation of cobalt nitrate and cerium nitrate at the appropriately selected molar ratio. The catalysts exhibit a superior $NO_x$ storage capacity at 100° C. Two-stage devices and methods for $NO_x$ abatement include a composition of the type described above.

Thus, $NO_x$ abatement compositions are disclosed, having a spinel structure and a formula according to Formula A:

$$Co_{3-x}Ce_xO_4 \qquad\qquad A.$$

wherein x is greater than zero and less than or equal to three. In certain particular implementations, x can be 0.25. It will be understood that cerium cations can substitute in the cobalt spinel structure at either of tetrahedral and octahedral sites. It will be understood that the generic formula for the disclosed compositions can alternatively be written as $Ce_xCo_{3-x}O_4$, as is the case in certain of the attached Drawings. It is further to be understood that these two formulae are equivalent, and do not imply any difference in cerium occupancy of octahedral or tetrahedral sites.

The disclosed $NO_x$ abatement compositions have improved catalytic activity toward the direct decomposition of $NO_x$ to $N_2$ and $O_2$, where $NO_x$ is defined as any combination of nitric oxide (NO) and ($NO_2$). Direct decomposition of $NO_x$ proceeds according to either or both of Reactions I and II:

$$2NO \rightarrow N_2 + O_2 \qquad\qquad (I), and$$

$$2NO_2 \rightarrow N_2 + 2O_2 \qquad\qquad (II).$$

Direct decomposition reactions are generally distinguishable from competing reactions by product formation. For example, incomplete decomposition reactions such as exemplary Reactions III and IV produce undesirable nitrous oxide rather than nitrogen gas:

$$4NO \rightarrow 2N_2O + O_2 \qquad\qquad (III), and$$

$$4NO_2 \rightarrow 2N_2O + 3O_2 \qquad\qquad (IV).$$

Similarly, various selective catalytic reduction (SCR) reactions can occur in the presence of a gaseous reducing agent, such as ammonia or alkane, and produce water, or water and carbon dioxide, rather than oxygen gas, as exemplified in Reactions V through VIII:

$$4NO + 4NH_3 + O_2 \rightarrow 4N_2 + 6H_2O \qquad\qquad (V),$$

$$2NO_2 + 4NH_3 + O_2 \rightarrow 3N_2 + 6H_2O \qquad\qquad (IV),$$

$$NO + CH_4 + O_2 \rightarrow N_2 + CO_2 + 2H_2O \qquad\qquad (VII), and$$

$$2NO_2 + 2CH_4 + 2O_2 \rightarrow N_2 + 2CO_2 + 2H_2O \qquad\qquad (VIII).$$

When oxygen is present, $NO_x$ may also be oxidized, such as shown in Reaction IX:

$$2NO + O_2 \rightarrow 2NO_2 \qquad\qquad (IX).$$

Under controlled reaction conditions where catalyst is exposed to a gas flow containing nitric oxide, any or all of Reactions I and IV can occur primarily, but Reaction IX can also occur secondarily as $O_2$ is produced by reactions I and IV. A combined reaction is shown in Reaction X:

$$(4a+4c-2b)NO \rightarrow aN_2 + bO_2 + cN_2O + (2a-2b+c)NO_2 \qquad\qquad (X)$$

A nitrogen product selectivity ($N_2$ selectivity) can be defined for such a combined Reaction X according to Equation 1:

$$N_2 \text{ selectivity } (\%) = \frac{2[N_2]}{2[N_2] + 2[N_2O] + [NO_2]} \qquad\qquad Eq.\ 1$$

$NO_x$ abatement compositions of the present teachings are further shown to possess appreciable activity as passive $NO_x$ adsorption (PNA) materials. Such materials are able to adsorb and store $NO_x$ at low temperature, and then release adsorbed $NO_x$ when higher temperatures are achieved. This property is useful for $NO_x$ abatement under cold start conditions, as explained further below.

Thus, and with reference to FIG. 1, a two-stage $NO_x$ abatement device 100 is disclosed. FIG. 1 shows a schematic plan view of an exemplary two-stage device 100. The device 100 can include an enclosure 140 having an inlet and an outlet. The enclosure 140 can be configured to contain a low-temperature $NO_x$ storage component 110, and a high-temperature $NO_x$ conversion catalyst 120 located downstream from the storage component 110. The $NO_x$ storage component 110 is configured to adsorb $NO_x$ when at low temperature, and to desorb $NO_x$ when at higher temperature. Thus, and in view of the results presented below, the $NO_x$ storage component 110 will generally include an $NO_x$ abatement composition of the present teachings, having the formula $Co_{3-x}Ce_xO_4$, as described above.

The $NO_x$ conversion catalyst 120 is generally configured to catalyze conversion of $NO_x$, through any of the reactions I-X described above. In certain implementations, the conversion catalyst 120 can specifically exclude an $NO_x$ abatement composition of the present teachings. In certain implementations, the conversion catalyst 120 can include a catalyst operable to catalyze direct $NO_x$ decomposition, according to Reactions I and/or II, above.

In some implementations, the storage component 110 and the conversion catalyst 120 can be spatially separated from one another, as illustrated in the example of FIG. 1. In such implementations, the storage component 110 and the conversion catalyst 120 can be in adjacent contact, or, as shown in FIG. 1, can be separated by a separation space 130. When present, such a separation space 130 can be substantially vacant, or can be occupied with a porous, gas permeable, or other suitable material.

The terms "upstream" and "downstream" are used herein in relation to an intended direction of exhaust gas stream flow through the device 100, represented by the arrow F in FIG. 1. For example, the storage component 110 can be positioned in an upstream portion of the exhaust gas stream, a region proximal to a gas inlet portion, and the conversion catalyst 120 can be positioned in a downstream portion of the exhaust gas stream, a region proximal to a gas outlet portion.

It will be understood that in implementations in which the storage component 110 is positioned in an upstream portion of the exhaust gas stream and the conversion catalyst 120 is positioned in a downstream portion of the exhaust gas stream, this can cause the exhaust gas stream to encounter the storage component 110 before the exhaust gas stream encounters the conversion catalyst 120.

Figure 2A:
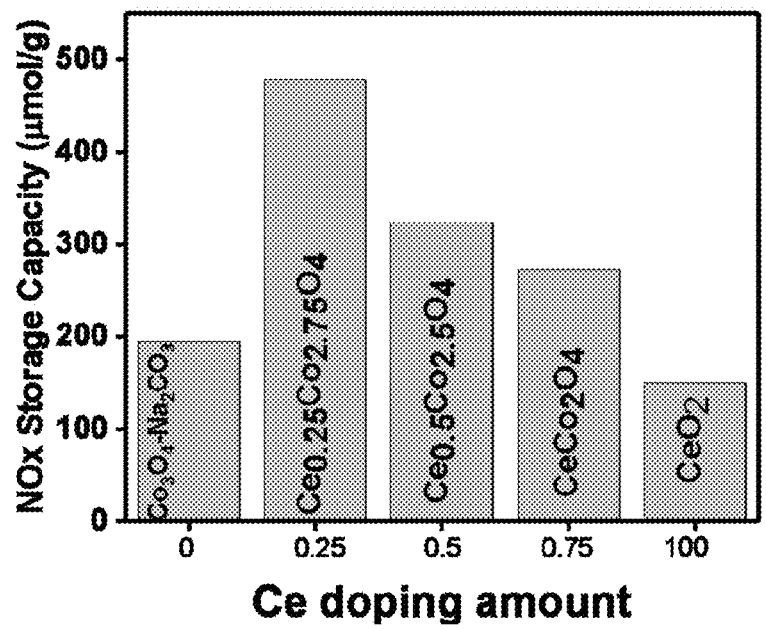
FIG. 2A is a bar graph showing $NO_x$ storage capacity of various $NO_x$ abatement compositions of the present teachings under non-flow conditions.
Figure 2B:
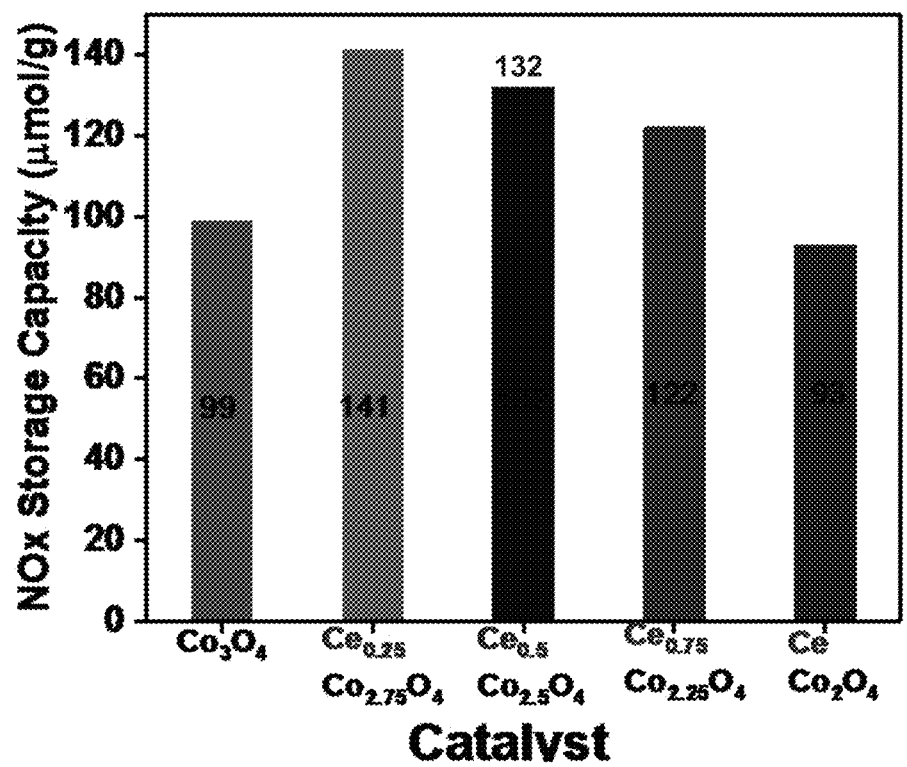
FIG. 2B is a bar graph showing $NO_x$ storage capacity of various $NO_x$ abatement compositions of the present teachings under flow conditions and in the presence of $O_2$ and $CO_2$.
Figure 2C:
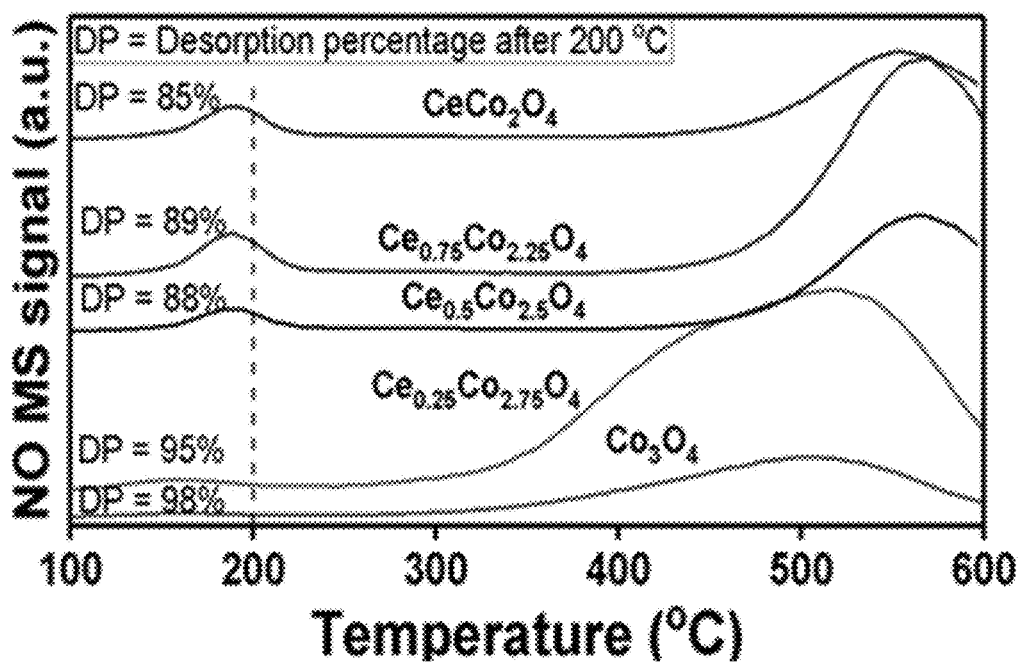
FIG. 2C is a plot of $NO_x$ desorption data of the compositions of FIG. 2B.

Thus, during a vehicle "cold start", when exhaust gas is at relatively low temperature, the low temperature exhaust gas will first encounter the storage component 110, where it will be adsorbed and stored, according to the thermal adsorption/desorption profiles of FIG. 2C. As the exhaust gas warms with increasing duration of engine operation, the storage component 110 will warm as well, resulting in desorption of the temporarily stored $NO_x$, so that the $NO_x$ can flow downstream to the conversion catalyst 120. It will be understood that most $NO_x$ conversion catalysts will have low-to-negligible catalytic activity at low, cold start temperatures. Thus, one benefit of the present device 100 is that cold $NO_x$ will be retained in the storage component 110 until the exhaust and the device 100 have warmed sufficiently to activate the downstream conversion catalyst 120. As such, it will be desirable that the conversion catalyst 120 be thermally matched with the storage component 110. For example, it may be desirable that the conversion catalyst 120 achieve at least 50% of maximum catalytic activity at a temperature of 300° C. or 400° C., so that it will be sufficiently active when $NO_x$ desorption from the storage component 110 begins.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

The $NO_x$ abatement composition can be a cerium-doped cobalt oxide. In some implementations, the $NO_x$ abatement composition can have a general composition of $Co_{3-x}Ce_xO_4$, where x is greater than zero (0) and less than or equal to three (3). In one or more implementations, x can include integers and fractions thereof. In some implementations, the $NO_x$ abatement composition can include a $NO_x$ abatement composition with the general formula of $Co_{3-x}Ce_xO_4$, where X is from about 0.2 to about 2. In some examples, the $NO_x$ abatement composition can include $Co_{2.75}Ce_{0.25}O_4$, $Co_{2.5}Ce_{0.5}O_4$, $Co_{2.25}Ce_{0.75}O_4$, and/or $Co_2CeO_4$. In further implementations, the $NO_x$ abatement composition can be deposited onto a support structure.

The $NO_x$ abatement composition, as used herein, can have a spinel structure. "Spinel," as used herein, generally refers to a conformation achieved by a variety of minerals of the general formulation $(A^{2+})(B^{3+})_2O_4$, where the A ion and B ion are each selected from mineral oxides. In the spinel structure, cerium cations can replace a portion of $Co^{2+}$ and/or $Co^{3+}$ cations at octahedral and/or tetrahedral sites in the spinel.

It is understood that cerium ions incorporated into the $NO_x$ abatement composition can include cerium ions in both the $Ce^{3+}$ and $Ce^{4+}$ oxidation states. Without intending to be bound by theory, it is believed that the relative concentrations of $Ce^{3+}$ and $Ce^{4+}$ oxidation states are important to the absorption and catalytic properties of the resulting $NO_x$ abatement composition. Specifically, an increase in $Ce^{3+}$ leads to improved adsorption and catalytic properties in the resulting $NO_x$ abatement composition. In some implementations, cerium plus three and cerium plus four concentrations can be reflected in the respective cerium oxides, $Ce_2O_3$ for $Ce^{4+}$ and $Ce_2O_3$ for $Ce^{3+}$. As such, the $NO_x$ abatement composition can comprise a $Ce_2O_3$ concentration of less than 10% of the total cerium oxide concentration, such as a $Ce_2O_3$ concentration of between about 7% and about 9%.

The cerium-doped cobalt oxides described herein can interact with the exhaust gases differently, either adsorbing or catalyzing the degradation of $NO_x$, based on temperature. In some implementations, the cerium-doped cobalt oxide receives the exhaust gases while at an initial temperature. Initial temperature, as used herein, is with reference to the combustion process, where initial temperatures are closer to atmospheric temperatures, and operating temperatures are closer to standard vehicle operating temperatures or above. Some examples of initial temperatures can include temperatures between about 0 degrees Celsius and about 400 degree Celsius, such as temperatures between about 100 degrees Celsius and about 300 degree Celsius.

The cerium-doped cobalt oxides described herein can adsorb or release $NO_x$ gases, based on temperature. In some implementations, the $NO_x$ abatement composition receives the exhaust gases while the $NO_x$ abatement composition is at an initial temperature. At the initial temperature, the $NO_x$ abatement composition adsorbs the $NO_x$ compositions in the exhaust gases. Initial temperature, as used herein, is with reference to the combustion process, where initial temperatures are closer to atmospheric temperatures, and operating temperature(s) are closer to standard vehicle operating temperatures or above. Some examples of initial temperature(s) can include temperatures between about 0 degrees Celsius and about 100 degrees Celsius, such as temperatures between about 100 degrees Celsius and about 100 degrees Celsius. Once the $NO_x$ abatement composition reaches the operating temperatures, such as above 100 degrees Celsius, the $NO_x$ abatement composition releases the majority of the adsorbed $NO_x$ gases. The desorbed $NO_x$ gases can then be further processed by the downstream systems, such as a distal stage.

The $NO_x$ abatement composition can be produced from cobalt and cerium precursors, such as by co-precipitation. In some implementations, the preparation of $NO_x$ abatement composition includes producing the $NO_x$ abatement composition and overlaying the produced spinel onto a support structure, such as a support oxide. In these implementations, producing the $NO_x$ abatement composition includes preparing a precursor solution of cobalt and cerium by mixing the appropriate amount of Co nitrate solution ($Co(NO_3)_2$) and Ce nitrate solution ($Ce(NO_3)_3$) with an appropriate solvent (e.g., water) to produce solution at the desired molar ratios. Different $Co_{3-x}Ce_xO_4$ catalysts can be synthesized by varying the ratio between $Co(NO_3)_3$ and $Ce(NO_3)_3$ such that the resulting molar ratio corresponds to the desired respective concentration as indicated by x (x=0.25, 0.5, 0.75 and 1).

Once prepared, the $NO_x$ abatement composition can then be precipitated from the cobalt-cerium precursor solution using an appropriate precipitating agent, such as $Na_2CO_3$. In some implementations, the precipitating agent can be added to the cobalt-cerium precursor solution in a dropwise fashion. The precipitating agent can be added until the desired pH is achieved, such as a pH of greater than about nine (9). In some examples, the precipitating agent can be added until a pH of from about nine (9) to about ten (10) is reached. The precipitate containing the $NO_x$ abatement composition can then be filtered from the precursor solution. After filtration, the residue including the $NO_x$ abatement composition can then be washed with an appropriate solvent, such as water or ethanol. The residue can then be heated for a period of time such that the residue is substantially free of moisture, such as overnight at about 120° C. The residue can then be calcined within a temperature range from about 600° C. to about 900° C. In some implementations, the residue is calcined at a temperature of about 600° C. for about 1 hour. The calcined residue is substantially composed of the $NO_x$ abatement composition. The $NO_x$ abatement composition can then be ground into a fine grain bulk powder.

The distal stage can be operatively connected to a proximal stage through a second connection. The second connection can provide a fluid connection, such that the exhaust gas is generally maintained as flowing directionally from the proximal stage to the distal stage. The distal stage can include a cobalt-cerium oxide material(s). Further, suitable materials for the distal stage can include materials which selectively reduce $NO_x$ to $N_2$ under lean-burn conditions. Lean-burn conditions, as used herein, generally includes when the A/F ratio of the fuel is greater than the ratio associated with the stoichiometric operation. In some examples, when the A/F ratio of the gas is greater than from about 14.4 to about 14.7 air to fuel by volume. The cobalt-cerium oxide material(s) can be loaded on a refractory oxide, a zeolite, other structures/compositions, or combinations thereof. Refractory oxides can include alumina, zirconia, silica-alumina, and/or titania. Exemplary zeolites can include zeolites having a Si:Al ratio greater than about 20:1, such as about 25:1.

In some implementations, the distal stage can include one or more after-treatment component(s). After-treatment component(s) are generally understood to be devices or compositions capable of removing, mitigating, decomposing (such as through reduction), or otherwise abating undesired compositions from internal combustion engine exhaust gases.

After-treatment component(s) can operate under a variety of conditions and temperatures, such as normal vehicle operating temperatures. The $NO_x$ abatement device 100 according to implementations described herein can include the $NO_x$ abatement composition and one or more other after-treatment component(s). Examples of the after-treatment component(s) usable in some implementations can include a selective catalytic reduction (SCR) catalyst, a particulate filter (including SCR filters), a three-way catalyst, an oxidation catalyst, an alternative or additional $NO_x$ adsorption catalyst, or combinations thereof. The cobalt-cerium oxide material(s) can be provided as a distinct component from the after-treatment component(s). In further implementations, the cobalt-cerium oxide material(s) 112 can be incorporated into the after-treatment component(s). In yet further implementations, one or more of the cobalt-cerium oxide material(s) can be used in any combinations with the after-treatment component(s).

In operation, the $NO_x$ abatement device 100 receives an exhaust gas from the exhaust system of the vehicle. The exhaust gases are delivered via a first connection to the proximal stage. At initial temperatures, the $NO_x$ abatement composition in the proximal stage receives the exhaust gases and absorbs $NO_x$ compounds from the exhaust gases. Concurrently, the remaining gases in the exhaust gas pass through the $NO_x$ abatement composition without significant adsorption. Thus, the remaining gases in the exhaust gas pass through to the second connection and the distal stage, where said gases continue to warm up each element to the operating temperature.

The proximal stage and the $NO_x$ abatement composition are generally expected to reach an operating temperature at approximately the same time as the second connection, and the distal stage. The operating temperature can overlap with or generally include a $NO_x$ gas release temperature for the $NO_x$ abatement composition. When the proximal stage and the $NO_x$ abatement composition reach the $NO_x$ gas release temperature, the absorbed $NO_x$ gases are released by the $NO_x$ abatement composition for abatement at the distal stage. Thus, the $NO_x$ abatement composition absorbs undesired gases, such as $NO_x$ gases, until such time that the distal stage reaches an operating temperature such that the after-treatment component(s) can properly abate the undesired gases.

FIG. 2A shows $NO_x$ storage capacities of $Co_3O_4$ and $Co_{3-x}Ce_xO_4$ $NO_x$ abatement compositions of the present teachings. The results show that the addition of 0.25 moles of Ce to the $Co_3O_4$ spinel improve the $NO_x$ storage capacity from 193 μmol/g to 477 μmol/g (i.e. more than a two-fold capacity improvement). However, further increase in the Ce doping leads to a decrease in the $NO_x$ storage capacity. Among the various catalysts, $CO_{2.75}Ce_{0.25}O_4$ exhibits the best storage capacity.

To investigate whether the increase in the storage capacity of $Co_{3-x}Ce_xO_4$ catalysts is due to formation of $CeO_2$, pure $CeO_2$ is synthesized by a similar method and evaluated for $NO_x$ storage. As shown in FIG. 2A, the pure $CeO_2$ synthesized by the similar method exhibits $NO_x$ storage capacity of only 149 μmol/g, thus confirming that $CeO_2$ is not responsible for the enhanced adsorption. These measurements show that $Co_{3-x}Ce_xO_4$ catalysts has unique structural properties compared to the $Co_3O_4$ and $CeO_2$ alone and exhibit superior $NO_x$ storage capacity at 100° C.

The samples described here for the $Co_{3-x}Ce_xO_4$ adsorption materials are synthesized by using co-precipitation. In this example, the co-precipitation method uses $Co(NO_3)_3$ and $Ce(NO_3)_3$ as the precursors and $Na_2CO_3$ as a precipitating agent. The concentrations of $Co(NO_3)_3$ and $Ce(NO_3)_3$ for each respective composition (e.g., $Co_{2.75}Ce_{0.25}O_4$, $Co_{2.5}Ce_{0.5}O_4$, and $Co_2CeO_4$) are synthesized here by varying the ratio between $Co(NO_3)_3$ and $Ce(NO_3)_3$. The concentrations of $Co(NO_3)_3$ and $Ce(NO_3)_3$ are dissolved separately in deionized water and mixed together. The precipitating solution, a 2M solution of sodium carbonate, was prepared and slowly added to the precursor solution dropwise. The pH of the precursor solution is monitored as the precipitating solution is added with agitation (e.g., a magnetic stirrer) until a pH level of from about nine (9) to about ten (10) is reached. The precipitate is then washed several times with distilled water to remove the sodium and chlorine compounds. The precipitate is then rinsed with ethanol. The supernatant liquid was then decanted, and filtered to obtain the precipitate. The precipitate was then dried overnight at 120° C. The acquired substance was then ground into a fine powder. Finally, the catalyst was calcined at 600° C. (2° C./min ramp rate) for 1 hour. Different $Co_{3-x}Ce_xO_4$ (x=0.25, 0.5, 0.75 and 1) catalysts were synthesized by varying the ratio between $Co(NO_3)_3$ and $Ce(NO_3)_3$.

As depicted in FIG. 2A, the $Co_{3-x}Ce_xO_4$ material compositions displays ample storage characteristics for $NO_x$ compounds. The $Co_{2.75}Ce_{0.25}O_4$ material sample has superior adsorption, at about 477 μmol of adsorbed NO per g of $Co_{2.75}Ce_{0.25}O_4$ material. As compared to the composition, $Co_3O_4$—$Na_2CO_3$, which measured at about 180 μmol of adsorbed NO per g of material, the $Co_{2.75}Ce_{0.25}O_4$ material shows more than a two-fold improvement in NO adsorption per gram of material.

However, further increase in the Ce concentration leads to a decrease in the $NO_x$ storage capacity. Increases in relative Ce concentration created a decrease in NO adsorption. The $Co_{2.5}Ce_{0.5}O_4$ material composition measured at about 320 μmol of adsorbed NO per g of material. The $Co_2CeO_4$ material composition measured at about 280 μmol of adsorbed NO per g of material. To make sure that the increase in the storage capacity of $Co_{3-x}Ce_xO_4$ material is not due to the Ce, the pure $CeO_2$ was synthesized by a similar method and evaluated for $NO_x$ storage. The $CeO_2$ material composition measured at about 149 μmol of adsorbed NO per g of material.

As such, all $Co_{3-x}Ce_xO_4$ material compositions performed better than the individual oxides ($Co_3O_4$ and $CeO_2$), and the $Co_{2.75}Ce_{0.25}O_4$ material sample has superior adsorption of NO during initial temperature operation. These measurements show that $Co_{3-x}Ce_xO_4$ material compositions have unique structural properties compared to the $Co_3O_4$ and $CeO_2$ alone and exhibit superior $NO_x$ storage capacity at 100° C.

FIG. 2B shows a comparison of the $NO_x$ storage capacities of the $NO_x$ abatement compositions of FIG. 2A, but under conditions that better approximate the working conditions of an $NO_x$ abatement device exposed to engine exhaust. While the results of FIG. 2A are measured in the steady state and with the composition exposed to NO only, the measurements of FIG. 2B are made under flow conditions and in the presence of NO, $CO_2$, and $O_2$, to better simulate engine exhaust conditions. These conditions can be referred to herein as "multi-gas flow conditions." The results show that the composition, $Co_{2.75}Ce_{0.25}O_4$, has superior $NO_x$ storage capacity relative to the state-of-the-art composition.

Briefly, the multi-gas flow conditions for measuring $NO_x$ storage can be described as follows: the experiments were performed in Netzsch thermogravimetric analyzer coupled with mass spectroscopy. Prior to storage the material was pretreated to 600° C. in the presence of $CO_2$ and $O_2$ (9% $CO_2$, 9% $O_2$ balance Ar) to remove the adsorbed impurities. After the pretreatment, the temperature is decreased to 100° C. in the presence of $CO_2$ and $O_2$, and the $NO_x$ storage was performed at 100° C. for 30 min using NO+$CO_2$+$O_2$ mixture (1500 ppm NO+9% $CO_2$+9% $O_2$ balance Ar). After the $NO_x$ storage the temperature was ramped from 100-600° C. in the presence of $CO_2$ and $O_2$ to desorb the NO.

FIG. 2C is a plot of $NO_x$ desorption data for various $NO_x$ abatement compositions of the present teachings. After the $NO_x$ storage the temperature was ramped from 100 to 600° C. in the presence of $CO_2$ and $O_2$ to release the stored NO. For practical applications $NO_x$ should be release after 200° C. Interestingly, all the catalysts release more than 85% of NO at temperatures exceeding 200° C. Among the various catalysts, both $Co_3O_4$ and $Co_{2.75}Ce_{0.25}O_4$ catalysts release more than 95% of NO after 200° C. which is very encouraging for practical applications.

Figure 3:
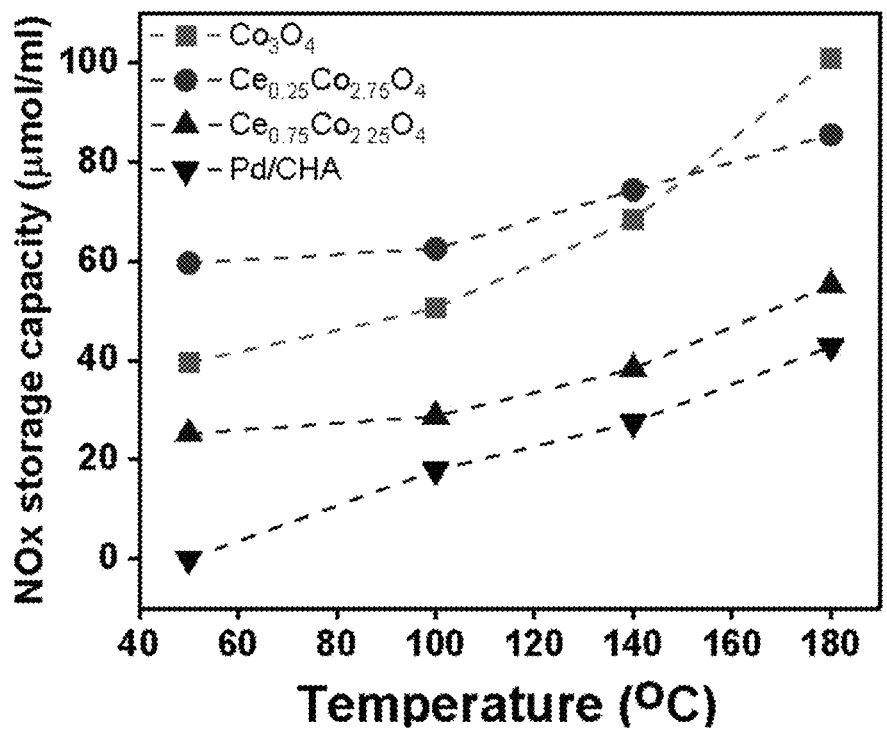
FIG. 3 is a plot of $NO_x$ adsorption capacity of various $NO_x$ abatement compositions of the present teachings, as well as a state-of-the-art comparative composition, under test engine conditions.

FIG. 3 is a plot of storage capacity of $NO_x$ abatement compositions of the present teachings at various temperatures under test engine conditions, and in comparison to a state-of-the-art PNA, palladium-doped chabazite zeolite (Pd/CHA). Briefly, 1 mL of pelletized (1.0-1.7 mm) abatement composition is placed in a fixed bed flow reactor. At a constant gas flow rate of 1 L/min, the sample is first ramped to 550° C. and maintained at this temperature under 1% $H_2$ gas (balance argon) for sample reduction. The sample is then pre-oxidized by ramping to either 180° C., 140° C., 100° C., or 50° C. under a mixture of 9/10/10% $O_2$/$CO_2$/$H_2O$. The sample is briefly exposed to an inert gas mix at this temperature before introduction of the test gas mixture: 9% O2, 10% $CO_2$, 10% $H_2O$, 0.04% NO, balance argon. The results definitively demonstrate the superior storage properties of the $NO_x$ abatement compositions of the present teachings. In particular, the $NO_x$ abatement compositions show greater $NO_x$ storage capacity than the state-of-the-art Pd/CHA at all temperatures. $Co_{2.75}Ce_{0.25}O_4$ is once again the best performing material, at all temperatures other than 180° C.

All samples tested showed temperature dependence for $NO_x$ storage capacity under the tested conditions. Though the degree and magnitude of the variation based on temperature differs between the materials, all $Co_{3-x}Ce_xO_4$ materials (doped and undoped) and Pd/CHA display an increase in $NO_x$ storage capacity is temperature increased. The $Co_{2.75}Ce_{0.25}O_4$ material displays a minimum $NO_x$ storage capacity at 50° C., with a measured storage capacity of about 60 μmol/ml, and a maximum $NO_x$ storage capacity at 180° C., with a measured storage capacity of about 80 μmol/ml. The undoped $Co_3O_4$ material displays a minimum $NO_x$ storage capacity of about 40 μmol/ml at 50° C. and a maximum $NO_x$ storage capacity of about 100 μmol/ml at 180° C. The $Co_{2.25}Ce_{0.75}O_4$ material displays a minimum $NO_x$ storage capacity of about 24 μmol/ml at 50° C. and a maximum $NO_x$ storage capacity of about 50 μmol/ml at 180° C. The control material, Pd/CHA, displays a minimum $NO_x$ storage capacity of about 0 μmol/ml at 50° C. and a maximum $NO_x$ storage capacity of about 35 μmol/ml at 180° C.

Figure 4:
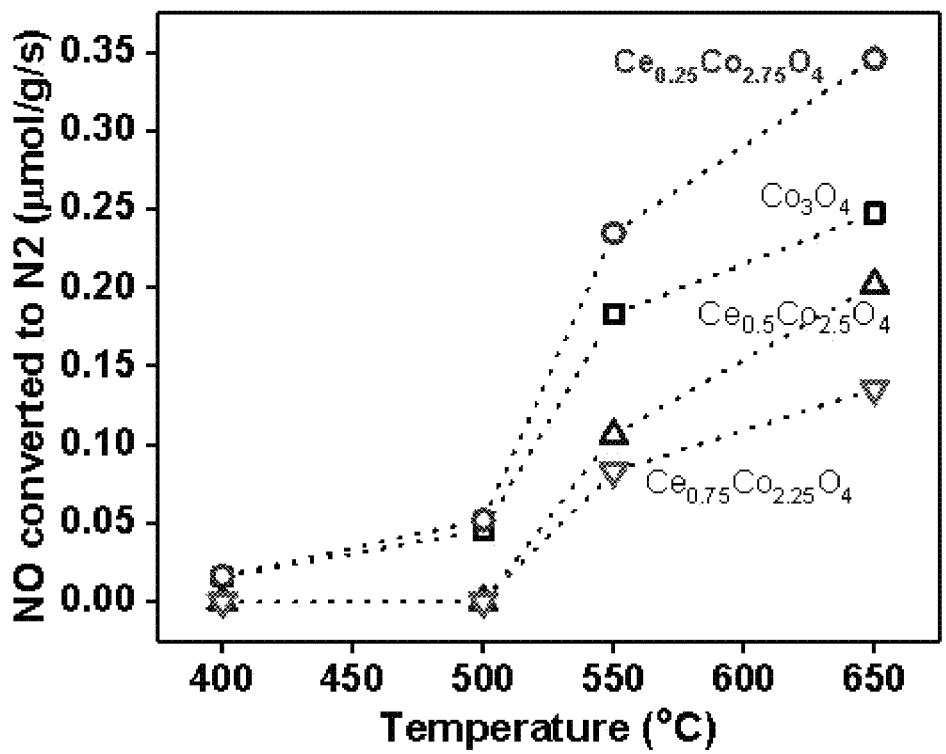
FIG. 4 is a plot of NO decomposition activity for various $NO_x$ abatement compositions of the present teachings at different temperatures.

It is to be noted that $NO_x$ abatement compositions of the present teachings possess direct $NO_x$ decomposition capability, in addition to their $NO_x$ storage capability. FIG. 4 shows direct NO decomposition activity profiles of $Co_3O_4$ and $Co_{3-x}Ce_xO_4$ compositions. As shown in the FIG. 4, all the Ce doped $Co_3O_4$ compositions exhibit better $NO_x$ decomposition activity compared to the undoped $Co_3O_4$. In general, the direct NO decomposition activity increases with increasing reaction temperature from 400 to 650° C. Interestingly, the direct NO decomposition activity increases with increasing Ce doping until 0.25 into $Co_3O_4$ and further increase in the Ce doping leads to decrease in the direct $NO_x$ decomposition activity. It is thus interesting to note that, while the $Co_{2.25}Ce_{0.75}O_4$ composition represents an optimum for $NO_x$ adsorption, $Co_{0.25}Ce_{2.75}O_4$ represents an optimum for $NO_x$ direct decomposition.

Figure 5:
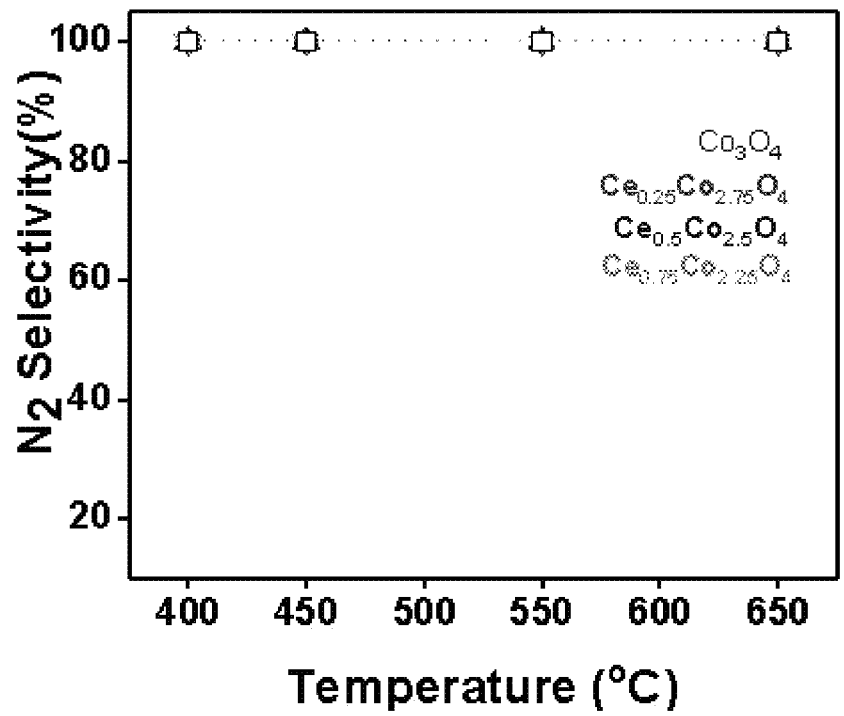
FIG. 5 is a plot of $N_2$ selectivity of the compositions of FIG. 4.

FIG. 5 shows $N_2$ selectivity profiles of $Co_3O_4$ and $Co_{3-x}Ce_xO_4$ compositions of the present teachings. The $N_2$ selectivity profiles are calculated for the $Co_3O_4$ and various $Co_{3-x}Ce_xO_4$ (x=0.5, 0.75, and 1) catalysts spinels and presented in FIG. 5. Interestingly, all the catalysts exhibit 100% $N_2$ selectivity in the temperature range 400-650° C. These measurements suggest that addition of Ce to the $Co_3O_4$ do not change the $N_2$ selectivity and the increase in the activity of the Co—Ce catalysts is not due to the unwanted side reactions.

Figure 6:
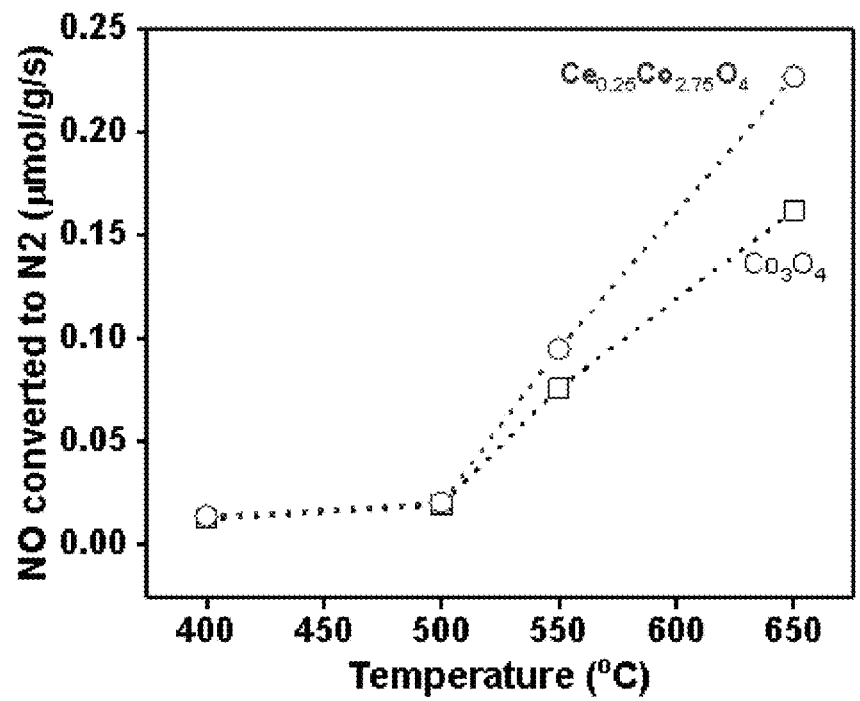
FIG. 6 is a plot of NO decomposition activity for various $NO_x$ abatement compositions of the present teachings at different temperatures and in the presence of oxygen.

FIG. 6 shows direct NO decomposition activity profiles of $Co_3O_4$ and $Co_{0.25}Ce_{2.75}O_4$ $NO_x$ abatement composition in the presence of 4.75% $O_2$. Both materials exhibit direct NO decomposition after 500° C. even in the presence of oxygen and the activity increases with increasing reaction temperature. The Ce doped $Co_3O_4$ catalyst exhibits better activity than $Co_3O_4$ at 550° C. and 650° C.

Figure 7:
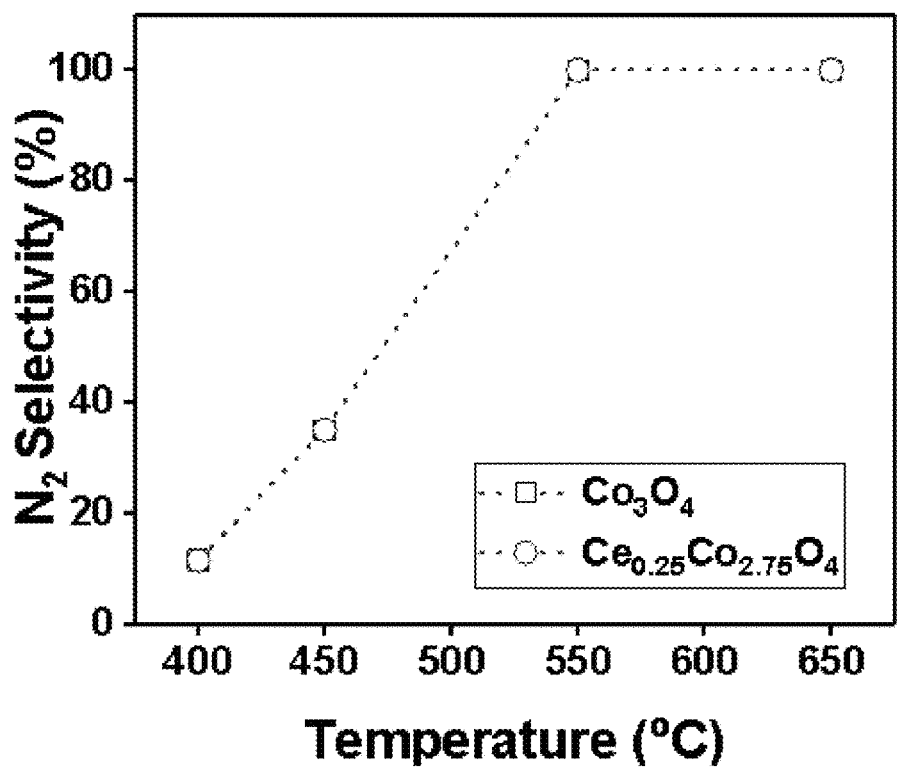
FIG. 7 is a plot of $N_2$ selectivity of the compositions of FIG. 6.

FIG. 7 shows $N_2$ selectivity profiles of $Co_3O_4$ and $Co_{3-x}Ce_xO_4$ catalysts in the presence of 4.75% $O_2$. It will be noted that, according to the results in FIG. 7, both the catalysts exhibit 100% $N_2$ selectivity after 500° C. even in the presence of oxygen.

Thus, in view of the cumulative results shown above, a method for removal of $NO_x$ from an exhaust gas stream is also disclosed. The method for removal of $NO_x$ from an exhaust gas stream includes a step of flowing the exhaust gas stream through an $NO_x$ abatement composition of the present teachings. In various implementations, the exhaust gas stream can include $NO_x$, and exclude reducing agents, so that SCR, or any other conversion routes requiring a reducing agent, are not possible. It will be understood that this is due to the particularly high activity for direct $NO_x$ decomposition as disclosed herein. In certain implementations, the exhaust gas stream should be within a temperature range of 450° C. to 650° C., just prior to contacting the $NO_x$ abatement composition. The $NO_x$ abatement composition, as employed in the method for removal of $NO_x$ from an exhaust gas stream, is as described above, and is synthesized according to the method for synthesizing an $NO_x$ abatement composition as described above.

Figure 8:
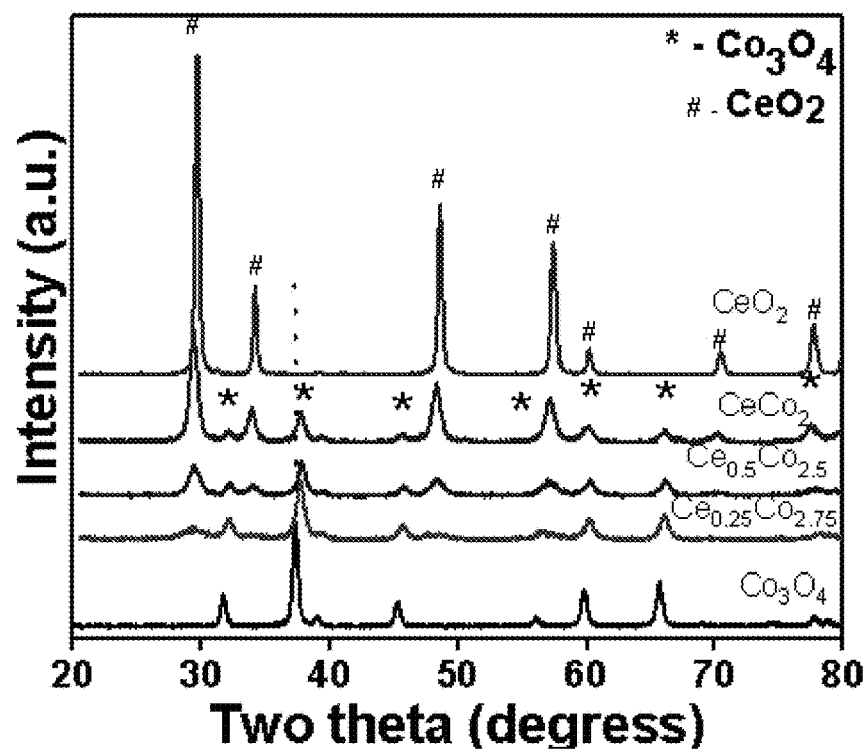
FIG. 8 is a plot of x-ray diffraction (XRD) spectra of various $NO_x$ abatement compositions of the present teachings at different temperatures.

FIG. 8 shows x-ray diffraction (XRD) spectra of $Co_3O_4$ and $Co_{3-x}Ce_xO_4$ catalysts. After calcination, $Co_3O_4$ exhibited peaks at 31.84, 37.45, 39.08, 45.32, 56.12, 59.93, 65.7, 74.7, 77.79, 78.93 degrees. These $2\theta$ values correspond to reflections of (220), (311), (222), (400), (422), (511), (440), (533), (620) (622) planes that are indications of the presence of the cubic inverse spinel structure. These diffraction lines provide clear evidence of the presence of $Co_3O_4$. All the diffraction peaks match well with the reported values (JCPDS file No:00-042-1467) and are indexed with the lattice parameter of a=8.018° A. The addition of 0.25 moles of Ce to the $Co_3O_4$ spinel leads to the few more additional amorphous peaks at 29.74, 48.65, 57.5, 78.52 degrees in addition to $Co_3O_4$ peaks. The peaks correspond to the cubic fluorite structure of $CeO_2$. The amorphous peaks converted to intense sharp peaks with increasing cerium loading from 0.25 to 0.5 and the intensity of the peaks increases with further increase in the Ce loading from 0.5 to 1. These measurements show that, cerium is in amorphous form in $Co_{2.75}Ce_{0.25}O_4$ catalyst and improves the $NO_x$ storage capacity and direct NO decomposition activity. Further increase in the cerium leads to the formation of crystalline $CeO_2$ and decreases the $NO_x$ storage capacity and direct NO decomposition activity.

Figure 9:
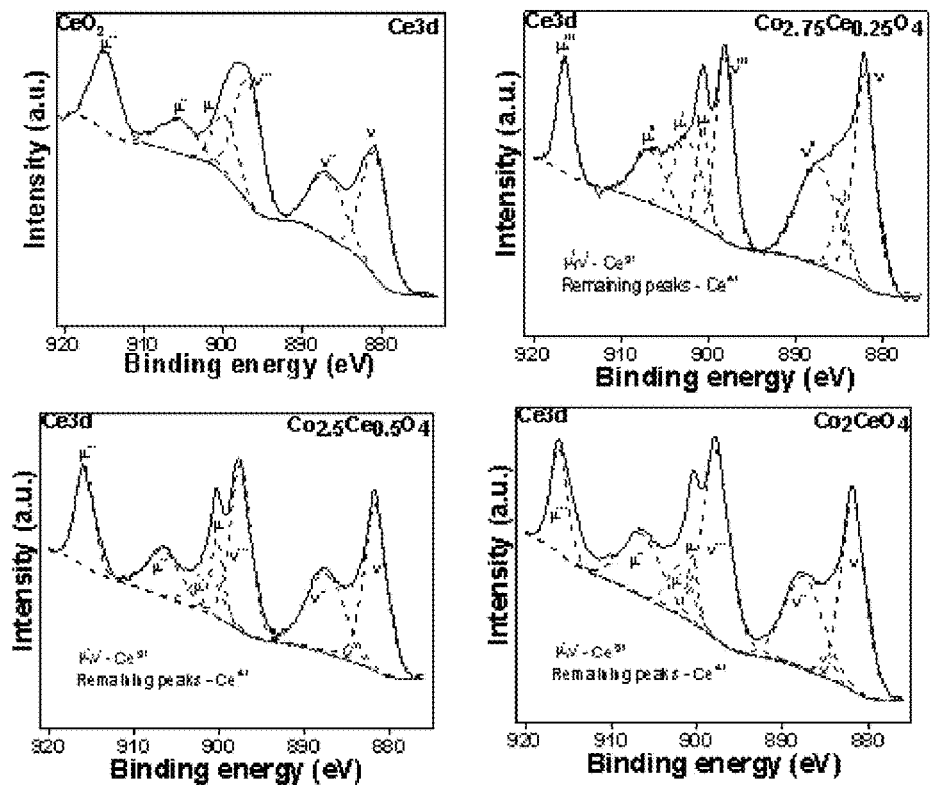
FIG. 9 shows four plots of x-ray photoelectron spectroscopy (XPS) data for various $NO_x$ abatement compositions of the present teachings at different temperatures.

FIG. 9 shows x-ray photoelectron spectra (XPS) in the binding energy region corresponding to cerium 3d orbitals for $Co_3O_4$ and $Co_{3-x}Ce_xO_4$ catalysts. The pure $CeO_2$ exhibits a total of six peaks in the Ce3d photoelectron spectra. The peaks labeled $\mu$ are due to $Ce3d_{3/2}$ spin orbit state and peaks labeled $v$ are due to $Ce3d_{5/2}$ spin orbit state. The peaks labeled $\mu'''$, $\mu''$, and $\mu$ and $v'''$, $v''$, and $v$ all are due to $Ce^{4+}$ oxidation state only. In addition to the peaks due to the $Ce^{4+}$ oxidation state, the $Co_{2.75}Ce_{0.25}O_4$ catalyst also exhibits two additional peaks at 902.6 ($\mu'$) and 884.8 eV ($v'$). There peaks arise from 5/2 and 3/2 spin orbit states of $Ce^{3+}$ oxidation state. These measurements show that incorporation of cerium into the cobalt lattice leads to cerium 4+ and 3+ oxidation states unlike pure $CeO_2$ where it shows only peaks due to 4+ oxidation state. Interestingly, all the Co—Ce catalysts exhibit peaks due to both 4+ and 3+ oxidation states.

It is difficult to calculate the amount of $Ce^{3+}$ in the Co—Ce catalysts since $\mu'$ and $v'$ peaks are surrounded by 4+ oxidation state peaks. However, the $\mu'''$ peak is not surrounded by any other peaks and the peak is belongs to 4+ oxidation state. Hence, area under the $\mu'''$ peak is used to calculate the amount of 3+ oxidation state in the Co—Ce catalysts. Lesser the area of $\mu'''$ peak more the $Ce^{3+}$ amount in the catalyst. The % of $\mu'''$ peak area to the total area of Co—Ce catalysts along with pure $CeO_2$ are presented. The % of $\mu'''$ peak area is 14% to the total area for pure $CeO_2$. All the Co—Ce catalysts exhibits lesser of % of $\mu'''$ peak area compared to pure $CeO_2$. The % of $\mu'''$ peak area decrease with increasing Ce doping until 0.25 moles into the $Co_3O_4$ lattice and further increase in the Ce amount leads to an increase in the % of $\mu'''$ peak area i.e. decrease in the $Ce^{3+}$ amount. These measurements suggest $Ce^{3+}$ amount is optimized at 0.25 moles ($Co_{2.75}Ce_{0.25}O_4$ catalysts) and responsible for the better $NO_x$ storage capacity and direct NO decomposition activity.

An exemplary catalyst, $Ce_{0.25}Co_{2.75}O_4$, exhibits better capacity than state of art material $PtO/BaO/Al_2O_3$. The catalysts further catalyze direct decomposition of NO to nitrogen and oxygen gas. The combined low temperature passive $NO_x$ adsorption capability and high temperature $NO_x$ decomposition activity makes the catalyst potentially effective in an $NO_x$ abatement device having an $NO_x$ adsorption stage followed by a decomposition catalyst stage. During a cold start, $NO_x$ is adsorbed by a disclosed composition in the adsorption stage. As exhaust heats up, adsorbed $NO_x$ desorbs and travels to the catalyst stage, where it is decomposed. To provide context, vehicles produce exhaust which includes some undesirable gases, such as nitrogen oxides ($NO_x$). Catalysts are generally used to reduce the concentration of said gases (referred to as "catalyst-based after-treatment"). "Catalyst," as used herein, is a composition which participates in a chemical reaction to increase the reaction rate, but is not consumed during the reaction. Noble metal catalysts can generally convert carbon monoxide and hydrocarbons in lean-burn vehicles. However, different methods, systems and materials for the efficient conversion of nitrogen oxides ($NO_x$) under lean-burn conditions can be desired. However, lean burn vehicles create additional challenges to emissions control in vehicle exhaust.

Lean burn vehicles are vehicles which operate the engine with an A/F ratio above a stoichiometric range. As the stoichiometric range generally falls within about 14.4 to about 14.7 parts air to one (1) part fuel, lean burn vehicles can generally include A/F ratios above about 16 parts air to one (1) part fuel. In some examples, the A/F ratio for a lean burn vehicle can include between about 19 and 27 parts air to one (1) part fuel. Some of the factors limiting $NO_x$ control by catalyst-based after-treatment systems include one or more facets of vehicle operation, including the desired performance for $NO_x$ decomposition at low exhaust temperatures. Further, lean-burn vehicles use excess air, which allows for more complete combustion of hydrocarbons and other carbon-containing sources. The availability of CO and hydrocarbons as reductants for $NO_x$ is, therefore, more limited in lean-burn vehicles. Therefore, the control of $NO_x$ emissions from lean-burn engines represents an on-going consideration, particularly at the low exhaust temperatures associated with modern, fuel-efficient engines.

Systems and methods disclosed herein include the use of a PNA device in combination with a $NO_x$ decomposition catalyst. In some implementations, the PNA adsorbs $NO_x$ emitted from the engine during cold starts. The PNA can then controllably release the $NO_x$, such as with relation to operating temperatures. The release can be configured to coincide with operating temperatures of the $NO_x$ decomposition catalyst, such as to improve the efficiency of catalytic activity. Some implementations include $NO_x$ decomposition and passive $NO_x$ adsorption using a material with general composition $Co_{3-x}Ce_xO_4$. The cobalt-cerium oxide material can exhibit effective $NO_x$ storage capacity at lower operating temperatures, such as about 100° C. The material can further catalyze the direct decomposition of $NO_x$ to nitrogen and oxygen gas at operating temperatures.

In one or more implementations, the cobalt-cerium oxide material can function as the PNA, the $NO_x$ decomposition catalyst, or both. In some implementations, the material can be employed as a lean-burn PNA and/or a $NO_x$ decomposition catalysts as part of a two-stage $NO_x$ exhaust treatment system. The combined initial temperature PNA capability and operating temperature $NO_x$ decomposition activity of the cobalt-cerium oxide material makes the material potentially effective in a two-stage $NO_x$ abatement device. Some examples of the two-stage $NO_x$ abatement device can include having a $NO_x$ adsorption stage followed by a decomposition catalyst stage. During a cold start, $NO_x$ can be adsorbed by the PNA in the adsorption stage. As exhaust heats up, adsorbed $NO_x$ desorbs from the PNA, where it can passively or actively travel to the catalyst stage, where it is decomposed.

The cobalt-cerium oxide material exhibits a superior $NO_x$ storage capacity at 100° C. One of the catalyst composition exhibit better capacity than available adsorption materials, such as $PtO/BaO/Al_2O_3$. Also, the cobalt-cerium oxide material effectively drives the NO decomposition without any addition of secondary reagents, which is greatly beneficial to improve the energy utilization of the engine. By employing $Co_{3-x}Ce_xO_4$ as a $NO_x$ adsorption material followed by a $NO_x$ catalyst in an exhaust gas passage, the conversion of $NO_x$ during lean-burn operation can be significantly improved. The implementations disclosed herein are more clearly described with reference to the figures below.

In the preceding description, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-9, but the implementations are not limited to the illustrated structure or application.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one implementation or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

What is claimed is:
1. A nitrogen oxide ($NO_x$) abatement device for use in an exhaust system of a vehicle, comprising:
 a $NO_x$ adsorption component configured to receive an exhaust gas, the $NO_x$ adsorption component comprising a cobalt-cerium oxide material, the cobalt-cerium oxide material having a spinel structure and an empirical formula of $Co_{3-x}Ce_xO_4$, wherein x is between 0 and 3; and a catalytic component fluidly connected to the $NO_x$ adsorption component, the catalytic component comprising a $NO_x$ catalyst comprising: a second cobalt-cerium oxide material having an empirical formula of $Co_{3-x}Ce_xO_4$, wherein x is between 0 and 3, loaded on alumina, zirconia, titania, and/or a zeolite having a Si:Al ratio greater than about 20:1; or a palladium, platinum, and/or rhodium comprising catalyst.

2. The $NO_x$ abatement device of claim 1, wherein the cobalt-cerium oxide material is $Co_{2.75}Ce_{0.25}O_4$.

3. The $NO_x$ abatement device of claim 1, wherein the $NO_x$ abatement device is configured to receive the exhaust gas moving in a flow direction, with the $NO_x$ adsorption component being upstream of the catalytic component.

4. The $NO_x$ abatement device of claim 1, wherein the catalytic component comprises $Co_{2.75}Ce_{0.25}O_4$.

5. The $NO_x$ abatement device of claim 1, wherein the $NO_x$ adsorption component further comprises $Co_3O_4$.

6. The $NO_x$ abatement device of claim 1, wherein the catalytic component comprises a selective catalytic reduction (SCR) catalyst comprising palladium, platinum, and/or rhodium; a SCR particulate filter comprising alumina, zirconia, silica-alumina, and/or titania; a three-way catalyst comprising palladium, platinum, and/or rhodium, and alumina, zirconia, silica-alumina, and/or titania; an oxidation catalyst comprising palladium, platinum, and/or rhodium; or combinations thereof.

7. A two-stage $NO_x$ abatement device for removal of $NO_x$ from engine exhaust during a cold start, the device comprising:

an enclosure having upstream and downstream portions defined relative to an intended direction of flow of exhaust gas;

a low-temperature $NO_x$ storage component configured to adsorb $NO_x$ when at low temperature, and to desorb $NO_x$ when at higher temperature, and comprising an $NO_x$ abatement composition having a formula $Co_{3-x}Ce_xO_4$, where $0<x\leq3$, and a spinel structure with cerium cations replacing a portion of $Co^{2+}$ and/or $Co^{3+}$ cations at octahedral and/or tetrahedral sites in the spinel; and a $NO_x$ conversion catalyst located downstream from the $NO_x$ storage component, and configured to catalyze conversion of $NO_x$, the $NO_x$ conversion catalyst comprising: a second cobalt-cerium oxide material having a formula $Co_{3-x}Ce_xO_4$, where $0<x\leq3$ loaded on alumina, zirconia, silica-alumina, titania, and/or a zeolite having a Si:Al ratio greater than about 20:1; or a palladium, platinum, and/or rhodium comprising catalyst;

wherein, during an engine cold start, $NO_x$ is retained in the $NO_x$ storage component until the exhaust and the device have warmed sufficiently to activate the $NO_x$ conversion catalyst.

8. The two-stage $NO_x$ abatement device as recited in claim 7, wherein the $NO_x$ abatement composition comprises $Co_{2.75}Ce_{0.25}O_4$.

9. The two-stage $NO_x$ abatement device as recited in claim 8, wherein the $NO_x$ abatement composition further comprises $Co_3O_4$.

10. The two-stage $NO_x$ abatement device of claim 7, wherein the $NO_x$ conversion catalyst comprises a selective catalytic reduction (SCR) catalyst comprising palladium, platinum, and/or rhodium; a SCR particulate filter comprising alumina, zirconia, silica-alumina, and/or titania; a three-way catalyst comprising palladium, platinum, and/or rhodium, and alumina, zirconia, silica-alumina, and/or titania; an oxidation catalyst comprising palladium, platinum, and/or rhodium; or combinations thereof.

11. The two-stage $NO_x$ abatement device of claim 7, wherein the $NO_x$ conversion catalyst comprises a direct decomposition catalyst comprising the cobalt-cerium oxide material.

\* \* \* \* \*